United States Patent [19]

Vincent et al.

[11] Patent Number: 5,598,067

[45] Date of Patent: Jan. 28, 1997

[54] ELECTROLUMINESCENT DEVICE AS A SOURCE FOR A SCANNER

[76] Inventors: Kent Vincent, 20863 Sola St., Cupertino, Calif. 95014; Gerd O. Mueller; Regina B. Mueller-Mach, both of 3491 Sweigert Rd., San Jose, Calif. 95132

[21] Appl. No.: 479,376

[22] Filed: Jun. 7, 1995

[51] Int. Cl.⁶ .................................................. G09G 3/10
[52] U.S. Cl. ...................... 315/169.3; 315/151; 313/498; 313/506; 399/151
[58] Field of Search ..................................... 315/151, 152, 315/155, 156, 169.1, 169.3; 313/498, 506, 509; 340/518; 355/200, 233, 83

[56] References Cited

U.S. PATENT DOCUMENTS

| | | | |
|---|---|---|---|
| 5,043,631 | 8/1991 | Kun et al. | 315/169.3 |
| 5,043,632 | 8/1991 | Asars et al. | 315/169.3 |
| 5,043,715 | 8/1991 | Kun et al. | 340/781 |
| 5,118,987 | 6/1992 | Leksell et al. | 315/169.3 X |
| 5,384,577 | 1/1995 | McLaughlin et al. | 315/169.1 X |
| 5,525,866 | 6/1996 | Mueller et al. | 315/169.3 |

*Primary Examiner*—Robert Pascal
*Assistant Examiner*—Haissa Philogene

[57] ABSTRACT

An electroluminescent device used as an illuminating source in a scanner. The device includes at least one solid-state electroluminescent element, which has a transparent electrode with a top surface, a radiation generating stack under the transparent electrode, and a second electrode with a bottom surface under the radiation generating stack. Radiation is generated from the radiation generating stack when a selected voltage source is coupled across the electrodes. Most of the radiation generated is emitted either from the top surface or from (the top and the bottom surfaces). When the scanner scans a medium, the emitted radiation is substantially uniform at least across the top surface of the transparent electrode to create a uniform radiation source for illuminating the medium.

25 Claims, 16 Drawing Sheets

5,598,067

ELECTROLUMINESCENT DEVICE AS A SOURCE FOR A SCANNER

CROSS REFERENCE TO RELATED APPLICATION

The present invention is related to a commonly assigned and U.S. application, titled, "An Edge Emitter As a Directional Line Source", invented by Mueller et al., and filed on Jan. 6, 1995, with a Ser. No. 08/369,598, now U.S. Pat. No. 5,525,866.

BACKGROUND OF THE INVENTION

The present invention relates generally to electroluminescent devices and more particularly to using an electroluminescent device as a radiation source for a scanner.

For a number of years, the best light source for scanning a document has been a fluorescent lamp. FIG. 1 shows such a tube fluorescent lamp. A large potential difference generated between the two electrodes at the ends of the tube breaks down a noble gas, such as argon, in the tube. Currents then conduct through the tube vaporizing and ionizing mercury droplets in the tube. When the mercury ions recombine after being excited, ultraviolet radiation is generated. The tube is coated by phosphors, which transform the incident ultraviolet radiation to visible light.

A fluorescent lamp is commonly used as the light source in an office document scanner because of its relatively low cost relative to prior art alternative light sources. However, the fluorescent lamp has some shortcomings when used for this purpose. Most notably, the fluorescent lamp is not a stable light source. It is an arc lamp, with light output highly dependent on the localized temperature dynamics of the arc, the noble gas and the vaporized mercury. Consequently, the light intensity from the lamp varies both spatially and temporally along the length of the lamp. Such variation degrades the accuracy of scanned images. Also, the fluorescent lamp should be warmed-up prior to use, as the heat generated from the arc has to vaporize and uniformly distribute the otherwise liquid drops of mercury. In addition, the fluorescent lamp is quite bulky and should be shielded to protect the scanner sensor from heat and stray light.

The problems are intensified in a color scanner as shown in FIG. 2A. In such a scanner, one typically needs three different broadband illuminators as the source to cover the visible spectrum. To scan the color of an area, each illuminator sequentially shines onto it. Reflections from each illuminator are measured to reconstruct the color of the area.

Normally, fluorescent lamp are broadband devices. Typically, the phosphors in each lamp are selected to irradiate in the red, green or blue of the visible spectrum, so that the three lamps fully cover the visible spectrum. In a prior art embodiment, the three lamps are put into an optical system so that they all illuminate a common scan line on an object, and the reflected_light is measured by a sensor. This system works, but may be inaccurate, wasteful and complicated because, in addition to all the above-identified difficulties of fluorescent lamps, the phosphors in each lamp age at different rates. This can lead to color error. Also, as shown in FIG. 2A, the light generated by each lamp is not directional. In scanning, one is looking at specific areas. The light that is not pointed towards those areas is wasted. In fact, such wasted light power usually tends to generate unwanted heat, which means that one needs to have thermal isolation.

FIG. 2B shows another prior art method using a single white light fluorescent lamp as the source of a typical scanner. In this example, the reflected beam is split into different paths to be measured by sensors that are sensitive to different colors. The difference in sensitivity to different colors may be achieved by placing different filters over the same type of sensors. This method again incurs the weaknesses of a fluorescent lamp.

Note that lasers or light-emitting-diodes (LEDs) are not very suitable as broadband illuminators. This is because both lasers and LEDs are inherently narrow-band devices. If the source is made up of a red, a green and a blue LED, color error may occur for an object area that is not primarily red or green or blue.

One excellent solution to the above problems has been proposed in a commonly assigned and co-pending U.S. application, titled, "An Edge Emitter As a Directional Line Source". That application describes different types of solid-state electroluminescent devices, all with edges. Each of them provides a broadband, directional, solid-state source that is stable, spatially and temporally uniform, rugged, efficient, compact and requires practically no warm-up period. The radiation generated emits from an edge of the device. If the devices are used in a scanner, it is very important for the devices to be stable spatially and temporally. In order to find out what one has scanned, typically, one compares the reflected radiation from the scanned surface with the incident radiation. A scanner would be much more expensive to accommodate for spatial and temporal variations in the incident radiation. Also, the devices in the co-pending application are very efficient because the radiation is emitted from edges over narrow lines. However, in some applications, one may not want to have the radiation confined to too narrow an area.

FIG. 3 illustrates one problem encountered by a very narrow source when it is used in a scanner. Typically, the medium scanned is planar, shown as dotted lines in FIG. 3. As light shines onto the planar medium, diffused light will be reflected and measured by a sensor. However, in many situations, one has to scan a medium with a curved surface, such as bound-printed subject matter close to the cusp of two adjacent pages. Due to the curvature of the medium, the light may impinge on a position quite different from the desired position; then the amount of the reflected diffused light reaching the sensor may be significantly reduced. One way to resolve the problem is to increase the power of the source and to widen the beam-width of the radiation through optics. However, this will increase the complexity and cost of the scanner.

It should be apparent from the foregoing that there is still a need for a broadband radiation source that is spatially and temporally uniform, with a beam-width more suitable to be used in a scanner, and that is relatively inexpensive to build.

SUMMARY OF THE INVENTION

The present invention is on a broadband radiation source that is spatially and temporally uniform, with a beam-width more suitable to be used as an illuminating source for a scanner, and that is relatively inexpensive to build. Also, the invented solid-state electroluminescent element provides a broadband, directional, stable, rugged, efficient, compact source, which requires no warm-up time.

In one embodiment, the solid-state electroluminescent element includes a transparent electrode with a top surface, a radiation generating stack under the transparent electrode, and a second electrode under the radiation generating stack. The second electrode has a bottom surface. With a selected voltage source coupled across the electrodes, the radiation generating stack emits radiation. Most of the radiation generated is emitted either from the top surface or from the top and the bottom surfaces, depending on the preferred embodiments. When the scanner using the electroluminescent element scans a medium, the emitted radiation is substantially uniform at least across the top surface of the transparent electrode. This would create a uniform radiation source for illuminating the medium.

Unless stated otherwise, the bottom electrode is preferably a reflective electrode. With radiation emitting from the top surface instead of from edges, the electroluminescent element can be more easily designed to be an illuminating source for a scanner. One can change the beam-width of the emitted radiation by changing the desired size of the top surface of the transparent electrode. In one embodiment, the top surface has a length of 9 inches and a width of a quarter of an inch.

The source is very rugged because it can be made of solid-state layers on a variety of mechanically strong substrates, such as glass. The source is also very efficient because radiation is emitted over a controlled area, which substantially coincides with the object line to be scanned. Inherently, the source is stable over a broad temperature range. The temperature across the invention is fairly uniform, and there is no warm-up requirement. Moreover, the light generated is both spatially and temporally uniform or homogenous because of the uniformity of the thin or thick-film process to make the device.

Preferably, the radiation generating stack includes an active layer sandwiched between two dielectric layers. The selected voltage source excites the dopant ions in the active layer; when the excited ions relax, radiation is generated. By careful selection of the dopant ions, one can tailor the bandwidth of the emission to increase the colorimetric accuracy of the source. In one embodiment, there are a number of active layers between the dielectric layers; the radiation emitted from different active layers centers around different frequencies so that the combined effect of the radiation has a desired spectral power distribution, such as white.

Another preferred embodiment of the present invention includes a sensor and a second electroluminescent element that is substantially the same as and positioned adjacent to the electroluminescent element described above. The scanner has a scanning surface that is substantially in contact to the medium being scanned. In this embodiment, the top surfaces of the transparent electrodes of the two electroluminescent elements are substantially coplanar to each other, and are parallel and in close proximity to the scanning surface. The elements and the sensor may even be integrated. This preferred embodiment may further include lens structures to control the radiation reflected from the medium to be measured by the scanner.

In the above described embodiments there are one or two electroluminescent elements that are substantially the same. However, the present invention is not constrained to such limitations. One can have three elements that are substantially identical to each other, except the radiation from each element is centered around a frequency different from the other elements. Preferably, the elements are electronically controlled to emit radiation sequentially or simultaneously. In fact, one is not limited to have just three elements.

In many applications, the electroluminescent element has an elongated shape with a flat-top surface. The uniformity of the emitted radiation across the medium to be scanned by such an elongated shaped element can be improved by a number of methods. For example, the widths at the two ends of the element are made wider than the width at the middle of the element; the radiation generating stack is thinner at the two ends of the element than at the middle of the element; or the voltages applied at the two ends of the element are higher than at the middle of the element.

In yet another preferred embodiment, an inductor is connected across the two electrodes of one of the above electroluminescent elements. The electroluminescent element and the inductor form a resonating circuit to increase the power efficiency of the element.

Other aspects and advantages of the present invention will become apparent from the following detailed description, which, when taken in conjunction with the accompanying drawings, illustrates by way of example the principles of the invention.

Same numerals in FIGS. 1–17 are assigned to similar elements in all the figures. Embodiments of the invention are discussed below with reference to FIGS. 1–17. However, those skilled in the art will readily appreciate that the detailed description given herein with respect to these figures is for explanatory purposes as the invention extends beyond these limited embodiments.

DETAILED DESCRIPTION OF THE INVENTION

Figure 1:
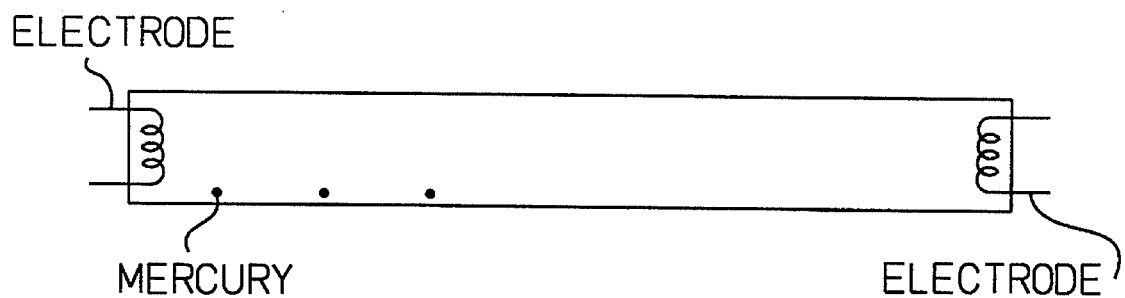
FIG. 1 shows a prior art tube fluorescent lamp.
Figure 2A:
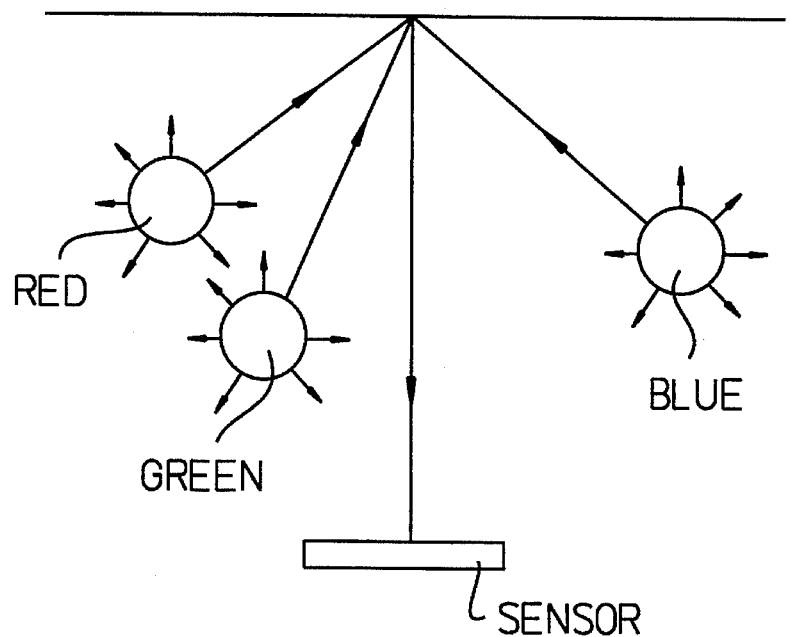
FIGS. 2A–B show prior art color sources using lamps.
Figure 2B:
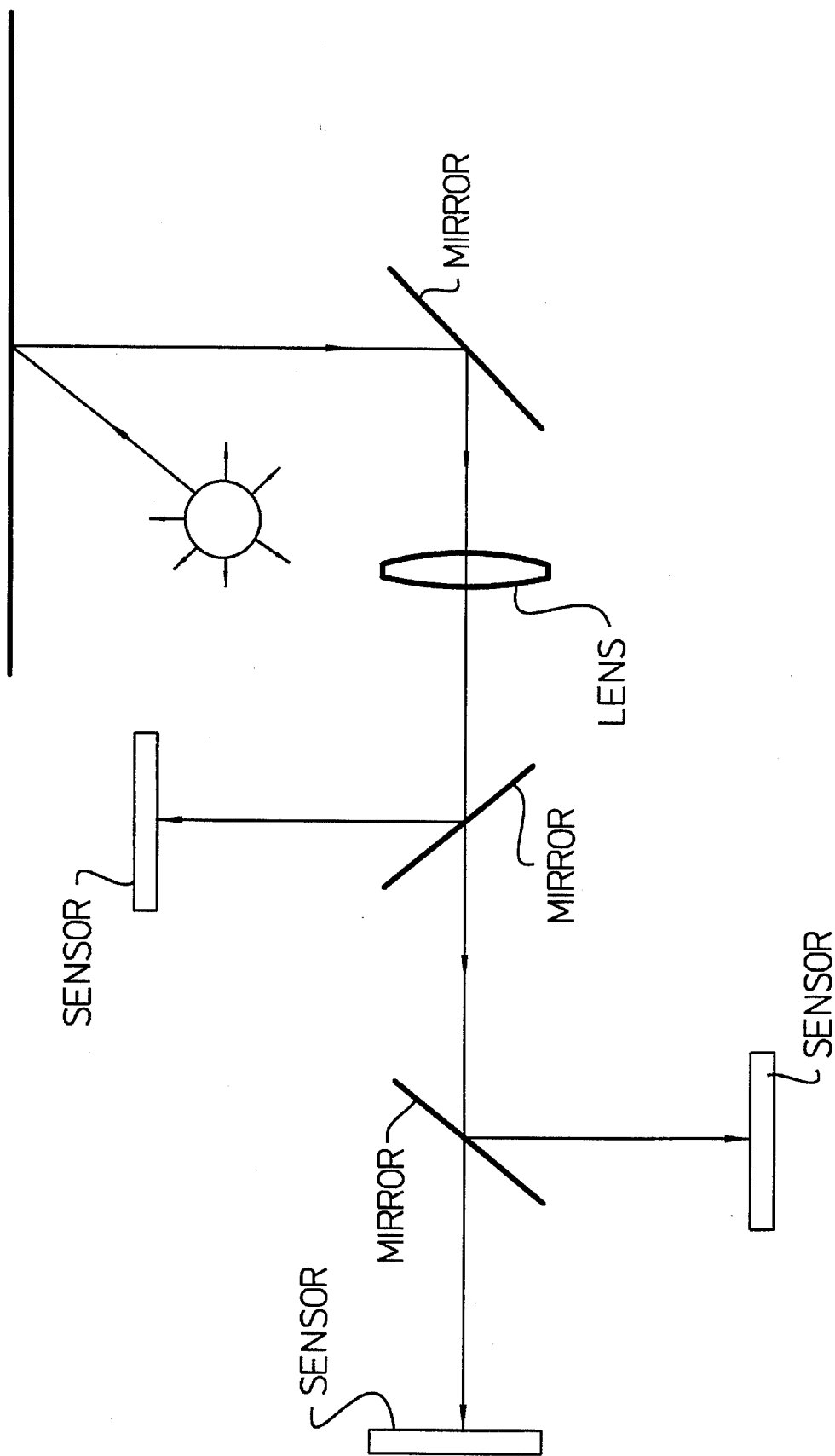
Figure 3:
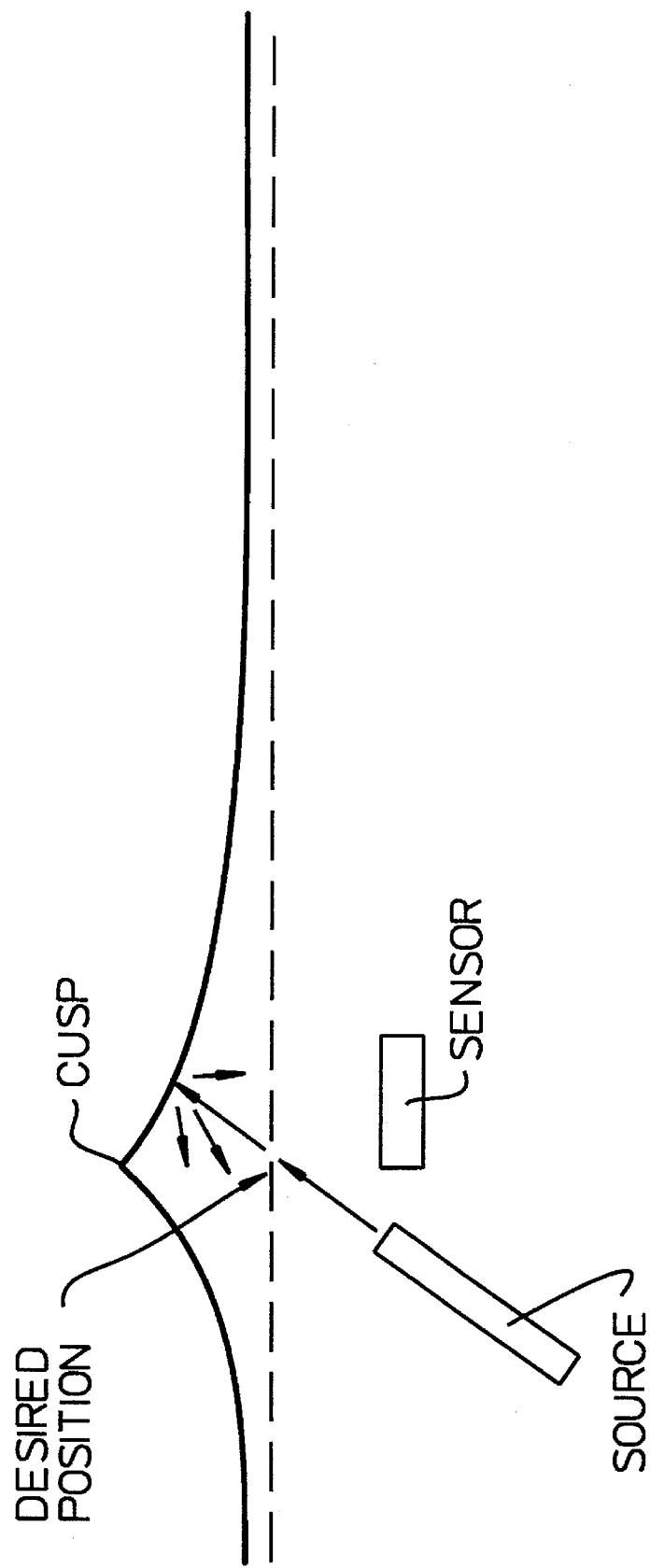
FIG. 3 shows a source and a sensor in a scanner scanning two pages from a book.
Figure 4A:
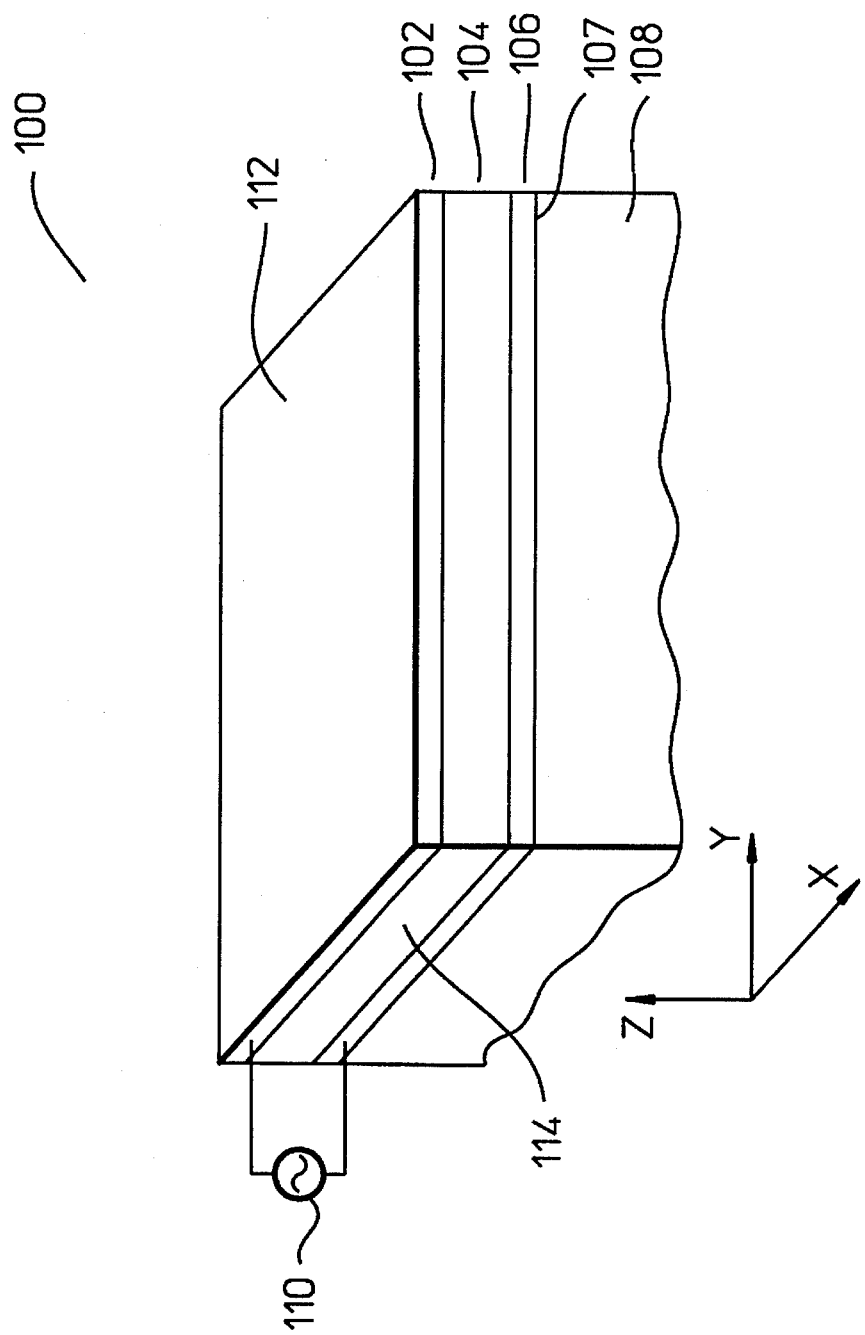
FIGS. 4A–F show different preferred embodiments of the present invention.

FIG. 4A shows a preferred electroluminescent element 100 of the present invention. The element 100 includes a transparent electrode 102 with a top surface 112, a radiation generating stack 104 and a second electrode 106, with a bottom surface 107. The electrodes are connected to a voltage source 110. Unless stated otherwise, the second electrode 106 is preferably a reflective electrode.

The electroluminescent element is very rugged because it can be made of a thin-film stack on a glass substrate, a ceramic substrate or other types of substrates 108. With light generated through electroluminescent, the source is very stable, with practically no non-uniform temperature rise or warm-up period. Moreover, the light generated and emitted from the top surface 112 is substantially uniform or homogenous both spatially and temporally because of the uniformity of the thin-film process in making the element.

Another benefit of the element is that it is flat and directional. Prior art fluorescent lamps are bulky and cylindrical in shape. When the lamps illuminate the medium to be scanned, light radiates into many different directions. Energy is lost, generating heat for the environment. Thus, one has to thermally isolate the lamps. A flat and directional solid-state source greatly alleviates such problems.

Figure 4B:
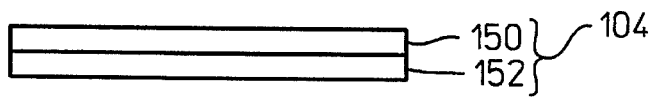
Figure 4C:
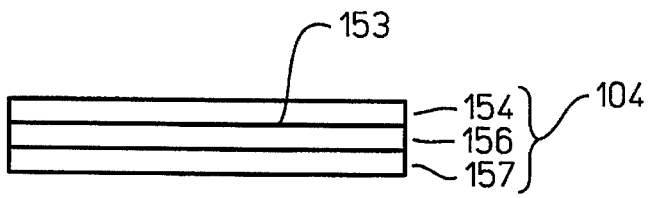

Different embodiments are suitable for the radiation generating stack 104. FIG. 4B shows one preferred embodiment with the stack including an active layer 150 and an insulating layer 152; and FIG. 4C shows another preferred embodiment with the stack 104 including an active layer 156 sandwiched between two insulating layers, 154 and 157.

The voltage of the source creates excited dopant ions in the active layer. When the excited dopants relax, photon radiation is generated. By controlling the level and the frequency of the voltage, one can control the power level of the radiation emitted. Although some of the generated radiation may leak out from the edges, such as 114, of the element, most of the generated radiation emits from the top surface 112. This is because, typically, the area of top surface 112 is orders of magnitude greater than the areas occupied by the edges. Also, in order for some of the radiation to be emitted from the edges, they might have to travel through a long distance before reaching an edge. Before they reach an edge, they may have been attenuated, or may have already emitted from the top surface 112, through the transparent electrode 102.

The amount of radiation emitted from the top surface can be increased by roughening either the top or the bottom surface. In fact, the amount of radiation can be increased by increasing the roughness of any interfacing surface between any of the layers described above, such as the interfacing surface 153.

Figure 4D:
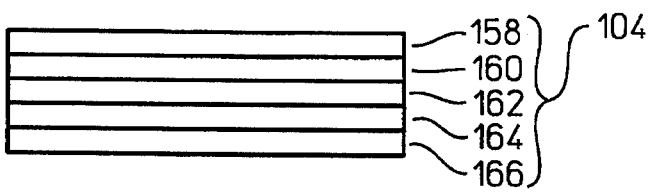

FIG. 4D shows another preferred radiation generating stack 104; it includes three active layers, 160, 162 and 164, between two insulating layers, 158 and 166. Typically, the radiation from each active layer centers around a frequency that is different from the other active layer. For example, one centers around blue-green, and another centers around red. When all the layers are excited, different radiation is combined to generate the radiation with a desired color.

Figure 4E:
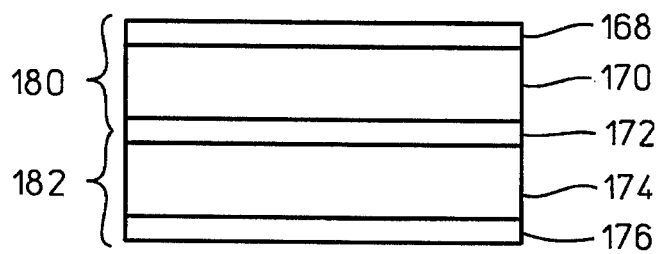

FIG. 4E shows another preferred embodiment with two electroluminescent elements, one on top of the other. One element 180 includes a transparent layer 168, a radiation generating stack 170 and another transparent layer 172; the second element 182 includes the transparent layer 172, a radiation generating stack 174 and a reflective electrode 176. The radiation from the two elements may radiate around different frequencies, or may radiate around the same frequency. If the frequencies are different, then the radiation of the combined effect would be at a color different from that of each individual element. If the frequencies are the same, then the amount of power radiated will be increased. Note that one can have more than two electroluminescent elements, one on top of the other.

Figure 4F:
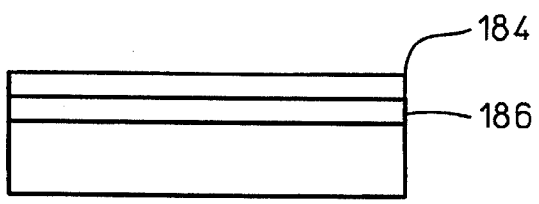

FIG. 4F shows another preferred electroluminescent element which is similar to the above described elements except it has a filter 184 on top of the transparent layer 186. In this embodiment, the emitted radiation is filtered before they are emitted.

The different embodiments described can be mixed and matched. For example, the filter in FIG. 4F may be used in the embodiments shown in FIG. 4B and FIG. 4C.

In one example, the active film is made of zinc sulphide doped with manganese; another type of active layer is made of strontium sulphide doped with cerium$^{3+}$ to emit radiation in the blue-green regions; a further type of active layer is strontium sulphide doped with europium$^{2+}$ to emit radiation 154 in the red region. One type of filter is made of a dyed polyimide, which attenuates the blue radiation leaving the green; another type of dyed polyimide attenuates the green radiation leaving the blue; a further type of filter is made of cadmium sulphide, which absorbs blue radiation and transmits green and red radiation.

In one working embodiment, a transparent electrode is made of indium tin oxide or zinc oxide of about 2000 Angstroms thick; a reflective electrode is made of aluminum of about 1000 Angstroms thick; an insulating layer is made of siliconoxinitride of about 2000 Angstroms thick; and the active layer is about 1 micron thick. The element is about 9" long in the Y direction, and ¼" wide in the X direction.

Although the films are described as thin-films, they are not limited to very thin layers. The layers may be made by different techniques, such as by vapor-deposition or thick-film processes; and as an example, an insulating layer may be as thick as ten microns. Also, although one electrode is described as transparent and the other reflective, both electrodes may be transparent; in such an embodiment, radiation will be emitted from two surfaces.

Figure 5:
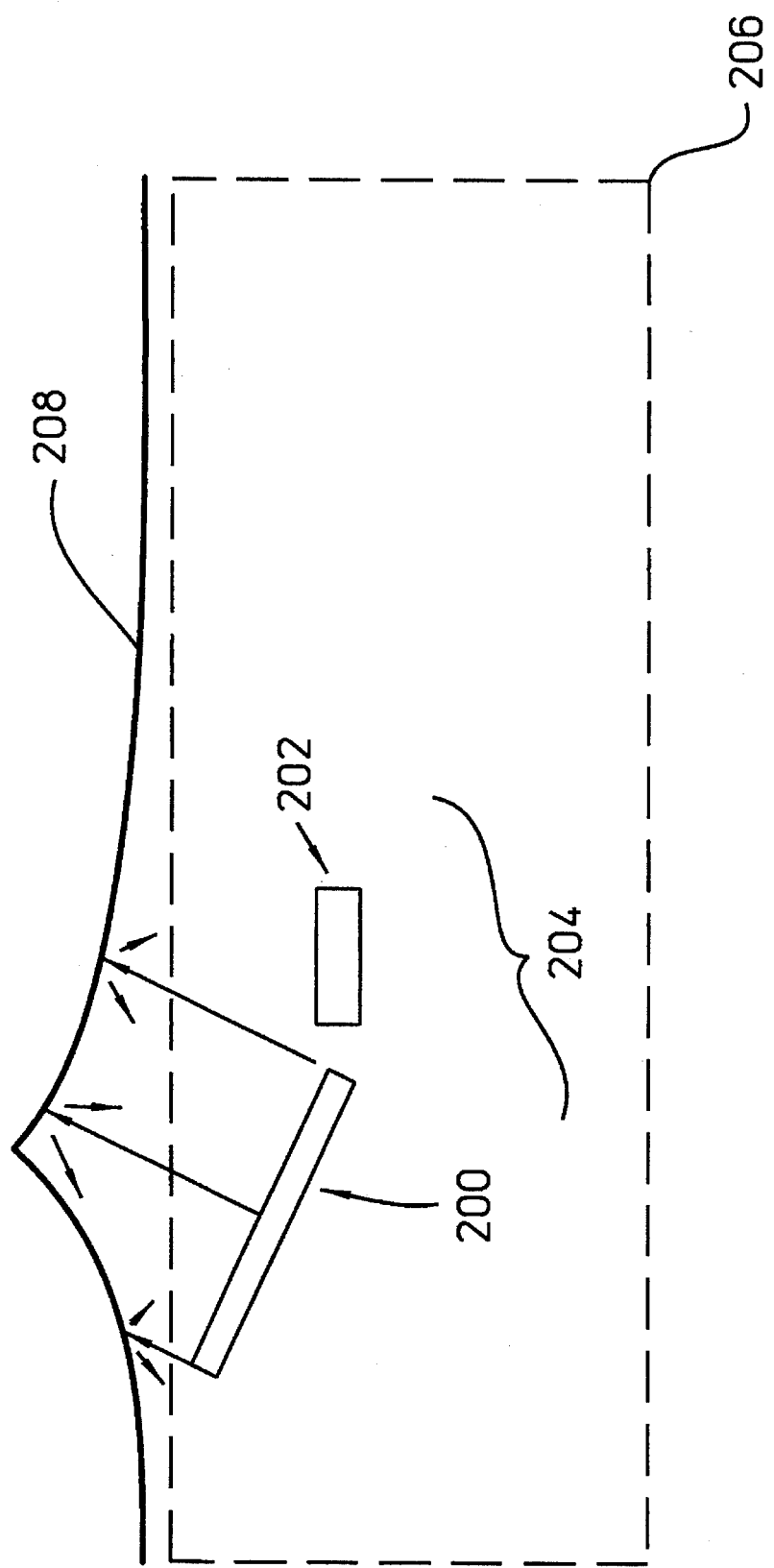
FIG. 5 shows a preferred embodiment scanning a medium.

FIG. 5 shows a preferred embodiment 204 with an electroluminescent element 200 and a sensor 202 in a scanner 206 scanning a medium 208. As described above, in some preferred embodiments, the width of the element can be ¼" or more, a significant amount of radiation will impinge onto the medium, and reflected by the medium to be measured by the sensor 202. In some other preferred embodiments, the width of the element can be narrower.

Figure 6A:
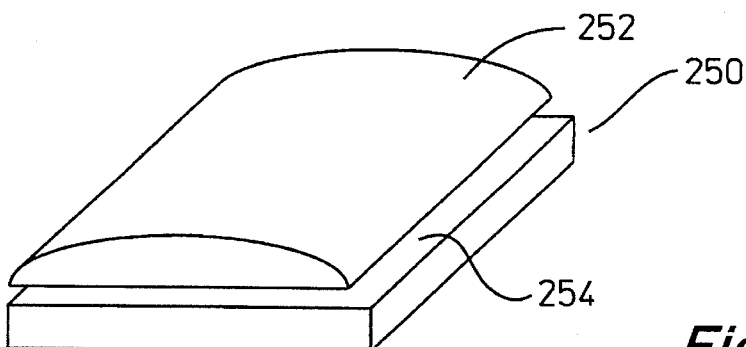
FIGS. 6A–C show a preferred electroluminescent element with different lens structures.

FIG. 6A show a preferred electroluminescent element 250 with one or more optical elements, such as a cylindrical lens 252 on the top surface 254 of the element 250. The lens distributes the radiation emitted from the element 254 to a desired illuminating area. In one preferred embodiment, the lens is integrated to the top surface of the element 250. For that embodiment, preferably the refractive index of the lens is substantially matched to the refractive index of the active layer. One preferred material for the lens is chalcogenide glass. The refractive index of the transparent electrode can also be substantially matched to the refractive index of the active layer; one preferred material for such a transparent electrode is zinc oxide.

Figure 6B:
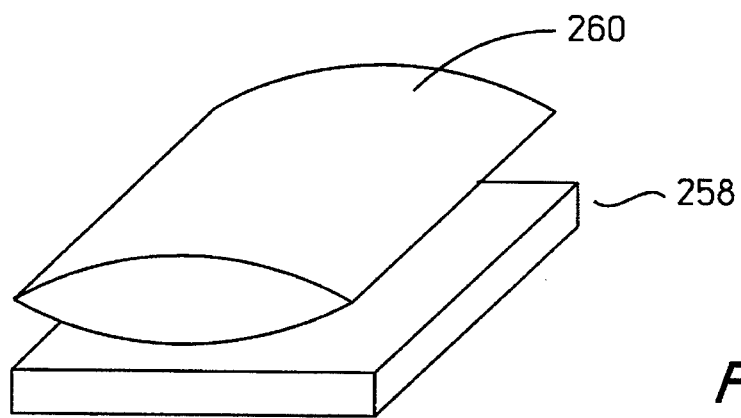
Figure 6C:
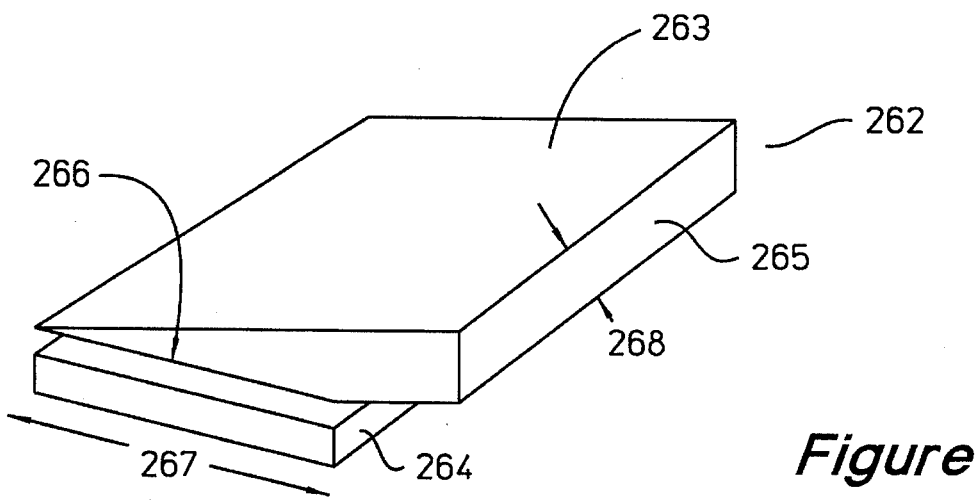

FIG. 6B shows another preferred electroluminescent element 258 with another example of cylindrical lens 260. FIG.

6C shows a trapezoidal prism 262 as the optical element on a preferred electroluminescent element 264. In this embodiment, most of the radiation generated is emitted from the top surface 263. One can redirect and concentrate the radiation generated by making the top surface 263 reflective. Then, most of the generated radiation is re-directed, and emits from the side surface 265. As an example, if the acute angle 266 of the trapezoidal prism is about 15 degrees, and the width 267 of the electroluminescent element 258 is 8 mm, then the width 268 of the side surface 265 is about 2 mm, and the intensity of the emitted radiation is increased by approximately four times.

Figure 7:
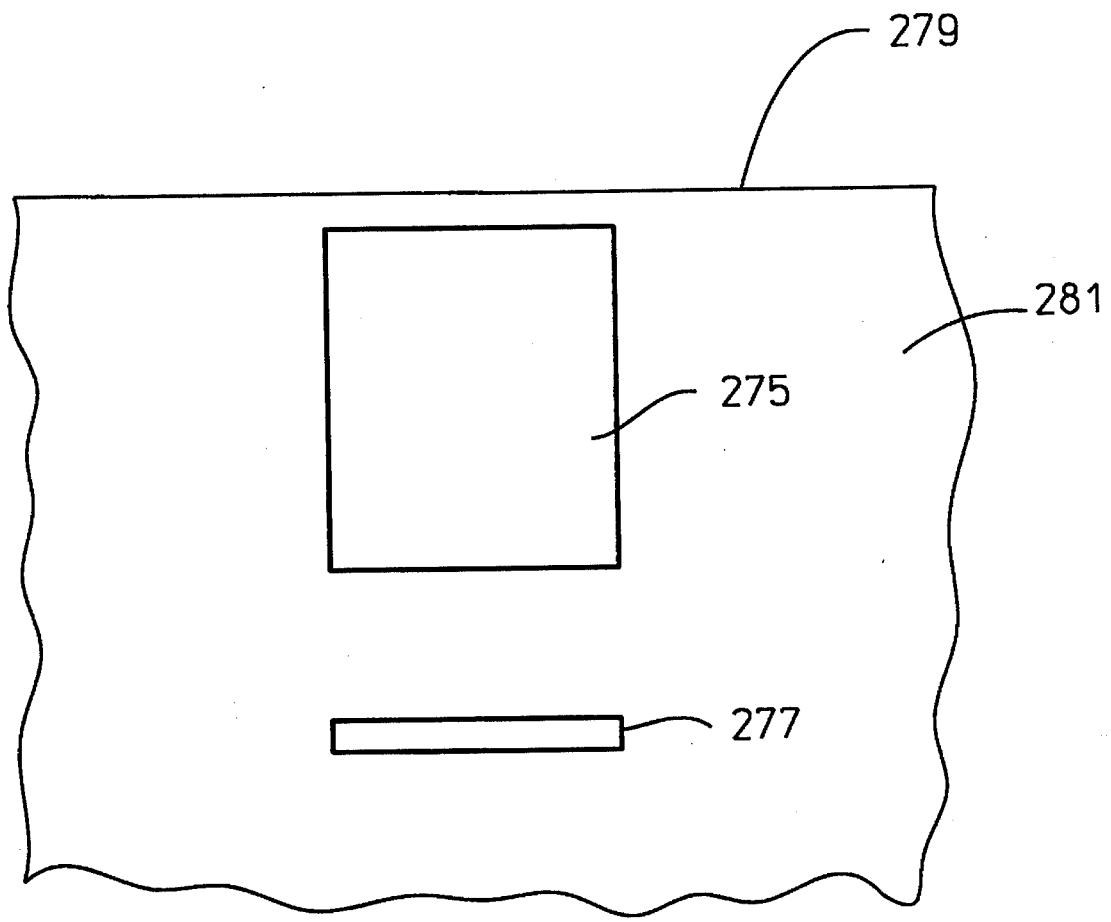
FIG. 7 shows a preferred embodiment with lens structure on a sensor.

In many applications, the sensor used in the preferred embodiments also includes one or more optical elements. An optical element includes one or more lenses, prisms, mirrors and diffractive elements. FIG. 7 shows a SELFOC lens 275, or a graded-index lens, for a sensor 277 in a scanner 281, with a scanning surface 279, which touches the medium to be scanned. The depth of focus of a typical SELFOC lens is about a few millimeters. So the lens should be close to the medium to be scanned, which is typically the case for the scanner inside a facsimile machine.

Figure 8A:
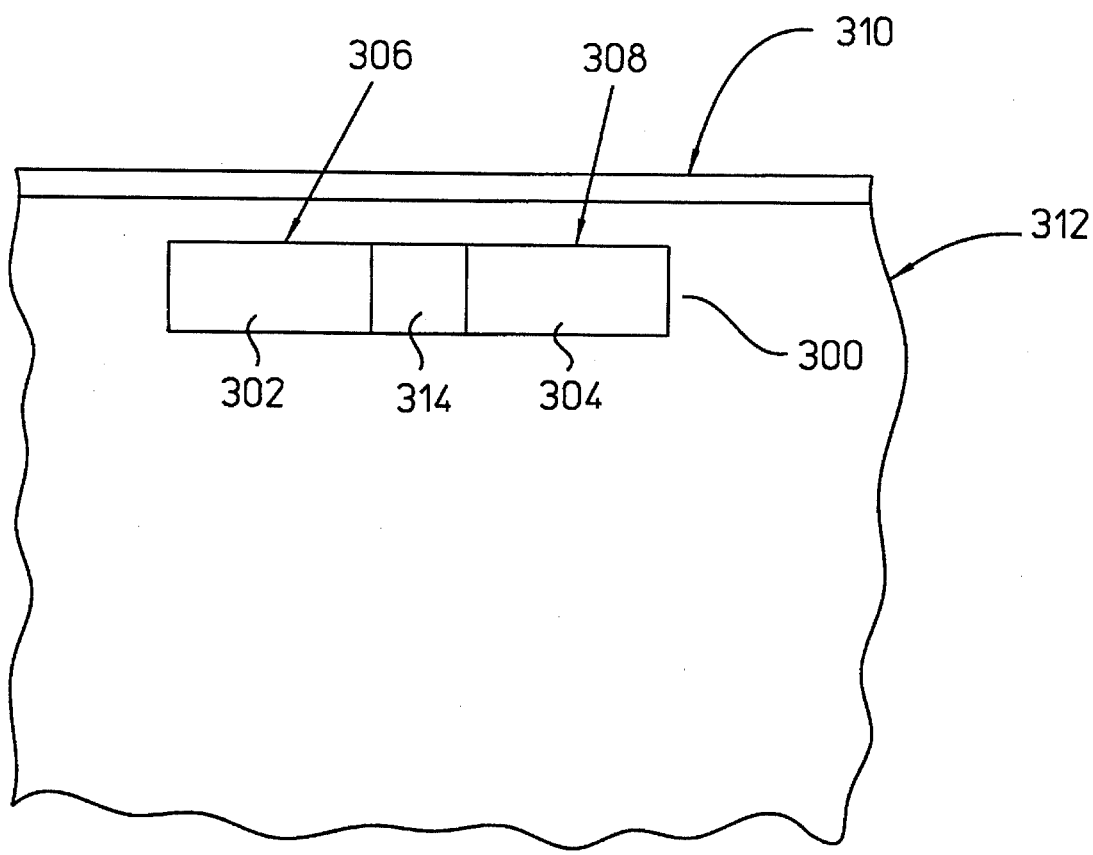
FIGS. 8A–E show different preferred embodiments with two electroluminescent elements.

FIG. 8A shows a preferred embodiment 300 with two electroluminescent elements 302 and 304. The top surfaces 306 and 308 of the two elements are substantially coplanar, and parallel and in close proximity to the scanning surface 310 of the scanner 312. In one preferred embodiment, a sensor 314 is between the two elements; such an approach is suitable to be used as a low cost and compact scanner.

Figure 8B:
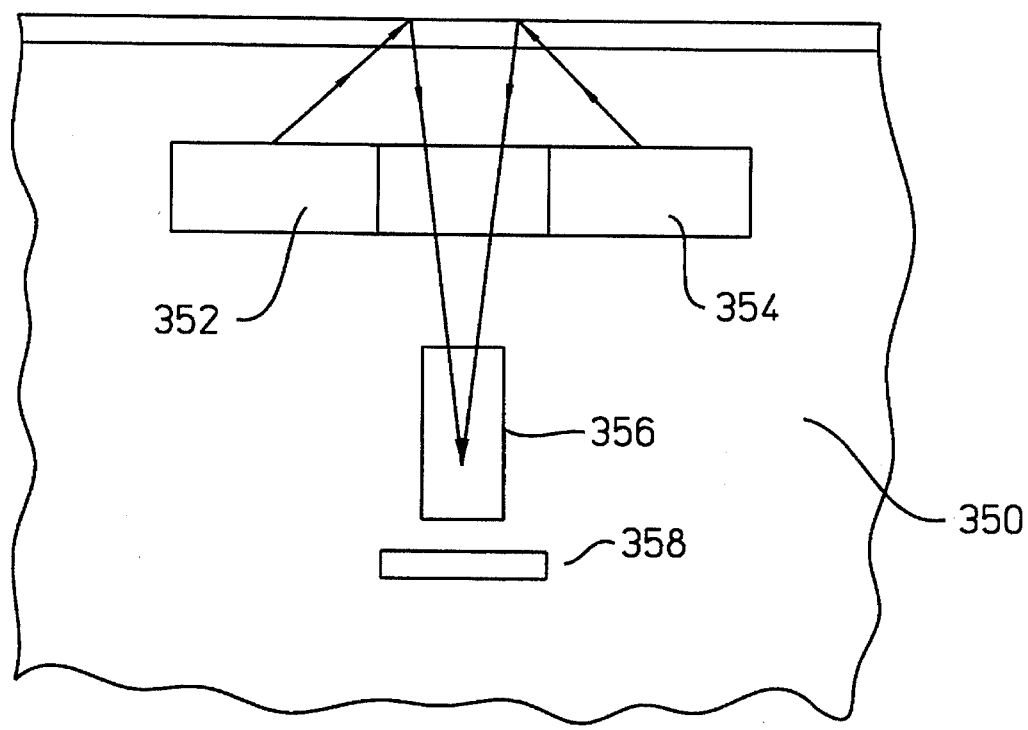
Figure 8C:
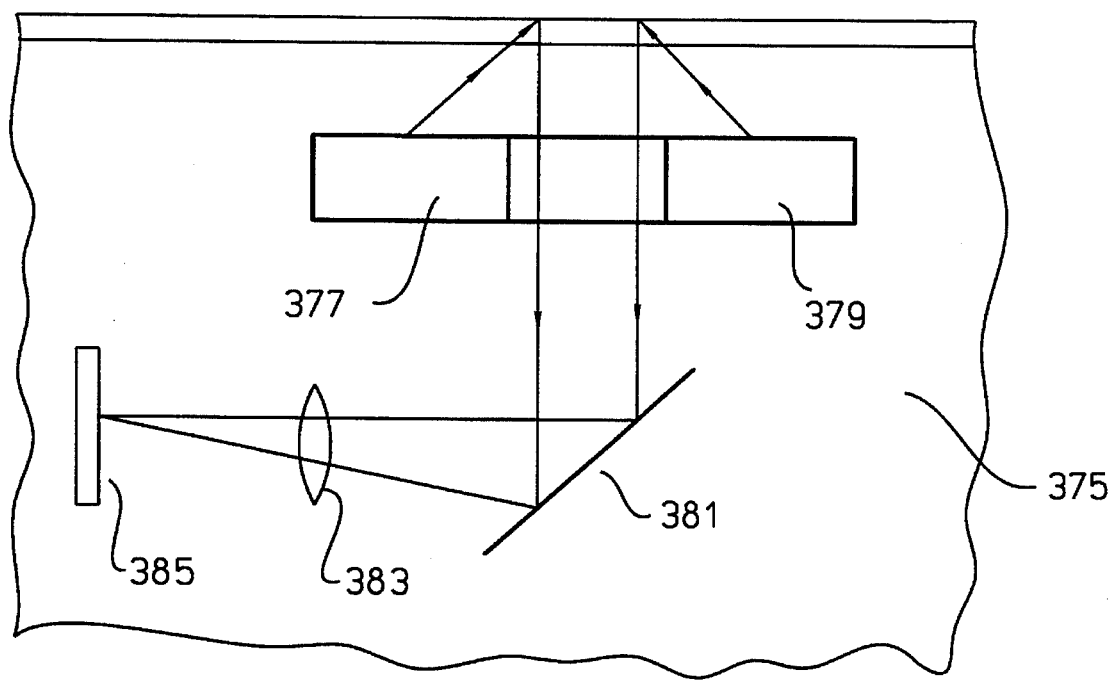

FIG. 8B shows another embodiment 350 with two electroluminescent elements 352 and 354. This embodiment 350 is suitable for a compact hand-held scanner. The space between the two elements is transparent. The radiation from the elements is focused by a SELFOC lens 356 to a sensor 358. FIG. 8C shows one more embodiment 375 with two electroluminescent elements 377 and 379. This embodiment is more suitable for a desktop document scanner. The radiation from the elements is reflected by a mirror, and is focused by a projection lens 383 to a sensor 385. The spacing between the two elements depends on the type of lens used for the sensor. In one example for the embodiment in FIG. 8C, the separation between the elements is about 1/16", and the elements are 9" long and 1/4" wide.

Figure 8D:
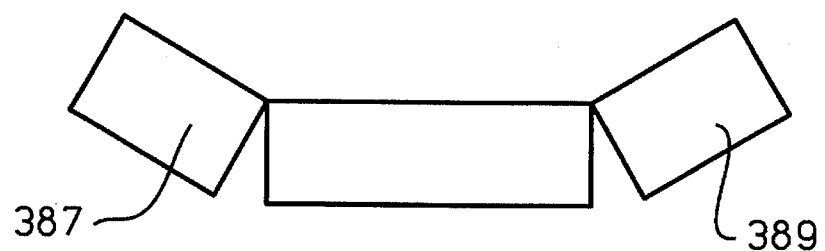
Figure 8E:
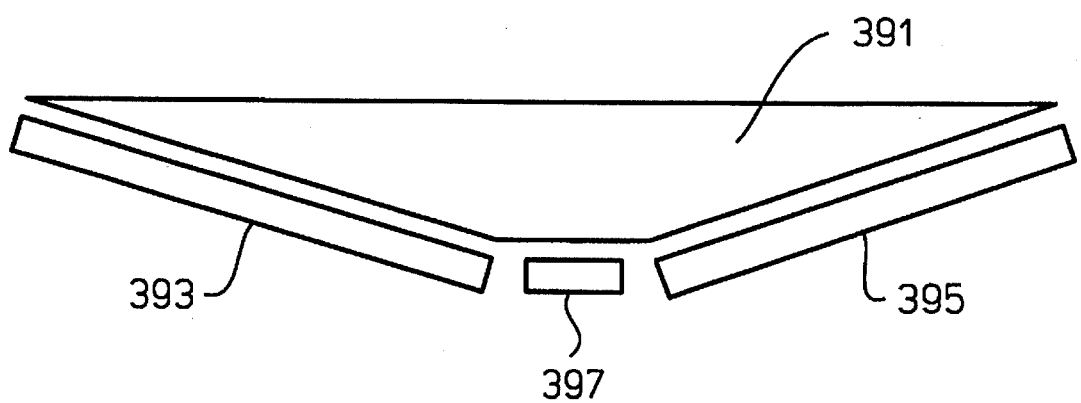

The top surfaces of the two electroluminescent elements described in FIGS. 8A–C are substantially coplanar. In other preferred embodiments, the two elements, 387 and 389, are tilted, as shown in FIG. 8D. The tilting helps to guide the emitted radiation towards desired directions. In FIG. 8E, guiding is further enhanced by a trapezoidal prism 391, with a sensor 397 positioned between two preferred electroluminescent elements, 393 and 395.

Figure 9:
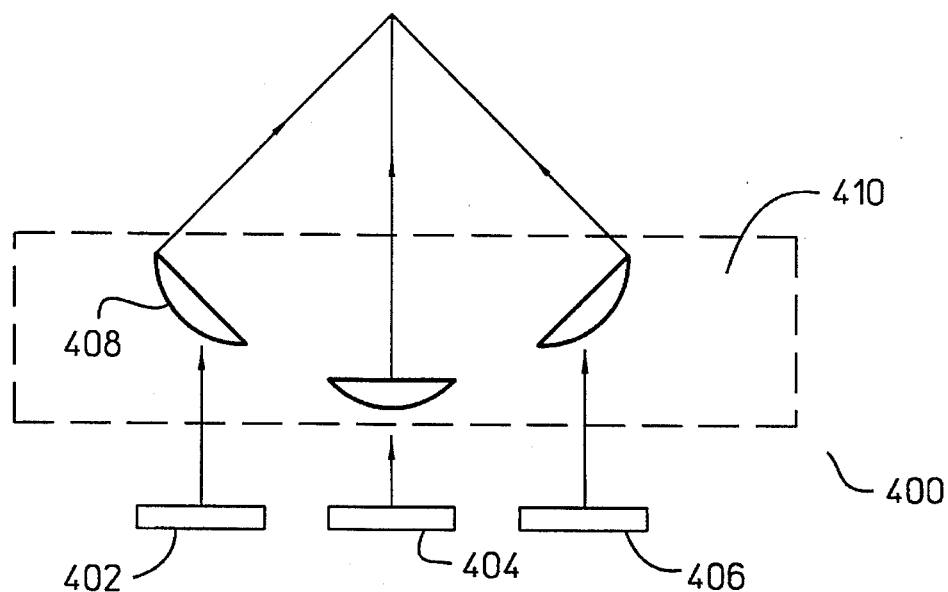
FIG. 9 shows a preferred embodiment with three electroluminescent elements.

FIG. 9 shows a preferred embodiment 400 with more than one electroluminescent element; in this case, there are three electroluminescent elements, 402, 404 and 406. The three elements are in the shape of elongated bars, similar in structure to those shown in FIGS. 6A–C, each with a flat top surface. In one embodiment, the flat top surfaces are substantially coplanar to each other. In another embodiment, the flat top surfaces of the electroluminescent elements on the two sides, 402 and 406, are tilted, as in FIG. 8D, to help guide the emitted radiation towards desired directions. FIG. 9 shows the view of a cross-section of the elements with their top surfaces substantially coplanar to each other. Typically, the radiation from the three elements centers around three different frequencies. Each of them is excited electronically so that the combined radiation from all of them has a desired spectral power distribution, with a selected power. If the three elements are not physically close enough together, preferably, each of them would have one or more optical elements to combine the radiation. For example, the element 402 has the lens structure 408. The three lens may be molded together to form a package 410 positioned on top of the elements.

The three elements do not have to be excited at the same time. In fact, one might prefer to excite them sequentially. Then one would need only one linear array of sensors to detect the emitted radiation. As the elements illuminate the medium to be scanned, the linear array of sensors detects the reflected radiation. With the three stacks excited sequentially, by synchronizing the sensors circuitry to the excitation frequency, one only needs one array of sensors to measure the color of the image.

In color scanning, active layers with appropriate filter layers may be used for each of the three elements. Then, by electronically controlling the power of the radiation from each element, one can combine the different radiation from the different elements to cover a large color gamut. An example of a large color gamut is one that encompasses the object color space. In one example, the three elements with three different spectral distributions center around the three primary colors, red, green and blue.

The elements can also act as color separators to give an accurate color reproduction of the medium being detected. In fact, filter layers may not be necessary for each of the elements if one uses active layers capable of generating colorimetrically adequate illumination. For example, the three elements may cover three different spectral distributions that are a good approximation to any linear combinations of the three CIE color matching functions.

In one preferred embodiment, the radiation from the three elements can combine to give a broadband white light source. Preferably, the power distribution of such a source should cover the visible spectrum, and should not have any significant nulls within the distribution.

One is not restricted to use three elements for color scanning. Another way is to use one element that radiates white light, with a number of filters rotated over a sensor to measure different colors. In one embodiment, a red, a green and a blue filters are used.

Figure 10:
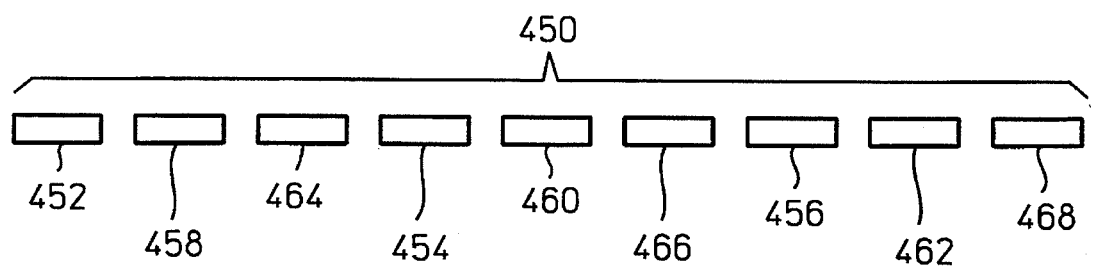
FIG. 10 shows a preferred embodiment with many electroluminescent elements.

FIG. 10 shows a preferred embodiment 450 to create a more uniform illumination with many electroluminescent elements. They are all positioned very close to each other. In one embodiment, the elements are separated into three groups. The first group includes elements 452, 454 and 456; the second group includes elements 458, 460 and 462; and the third group includes elements 464, 466 and 468. The radiation of the elements from each group centers around a frequency that is different from those in a different group. In the preferred embodiment 450, the elements are interleaved together in a sequential manner, with the sequence following the group number, and with the element from the first group selected after the third group. In one preferred mode of operation, the elements are electronically controlled so that elements from each group emit radiation together, and the emission from each group is done in a sequential manner. In another mode of operation, all the elements emit together, and the combined effect of the radiation from the elements is perceived to have a desired spectral power distribution.

Figure 11:
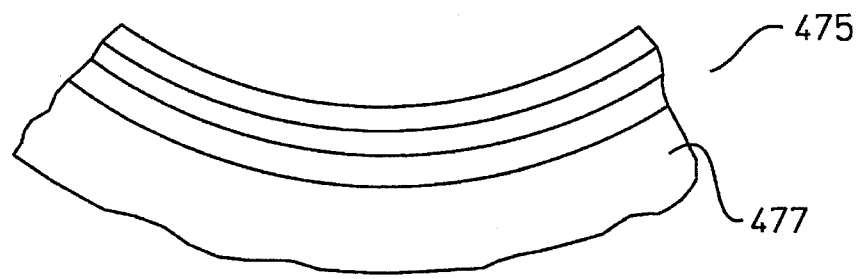
FIG. 11 shows a preferred electroluminescent element with a curved top surface.

FIG. 11 shows a preferred electroluminescent element 475 that is curved to help focusing radiation emitted from the element 475 along a desired direction. In this embodiment, each layer on top of the substrate 477 substantially replicates the curvature of the substrate 477.

Figure 12:
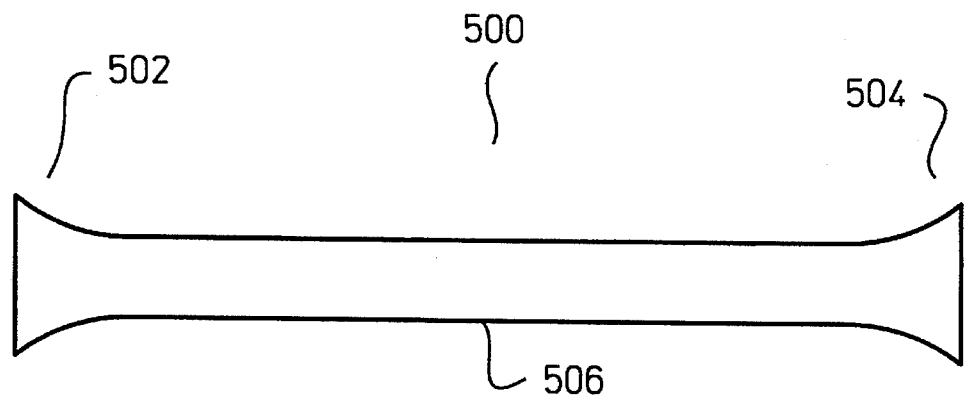
FIG. 12 shows a preferred electroluminescent element with its width wider at its ends than at its middle section.
Figure 13:
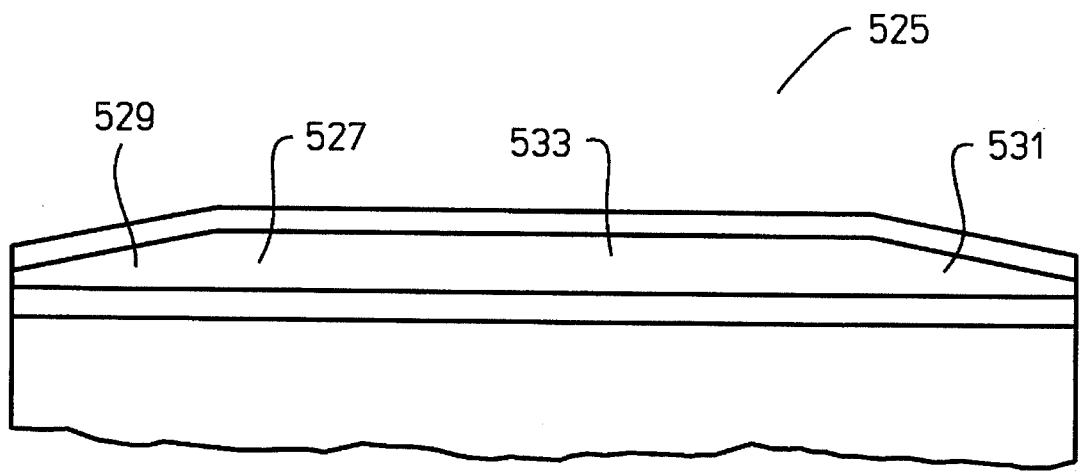
FIG. 13 shows a preferred electroluminescent element with its active layer thinner at its ends than at its middle section.
Figure 14:
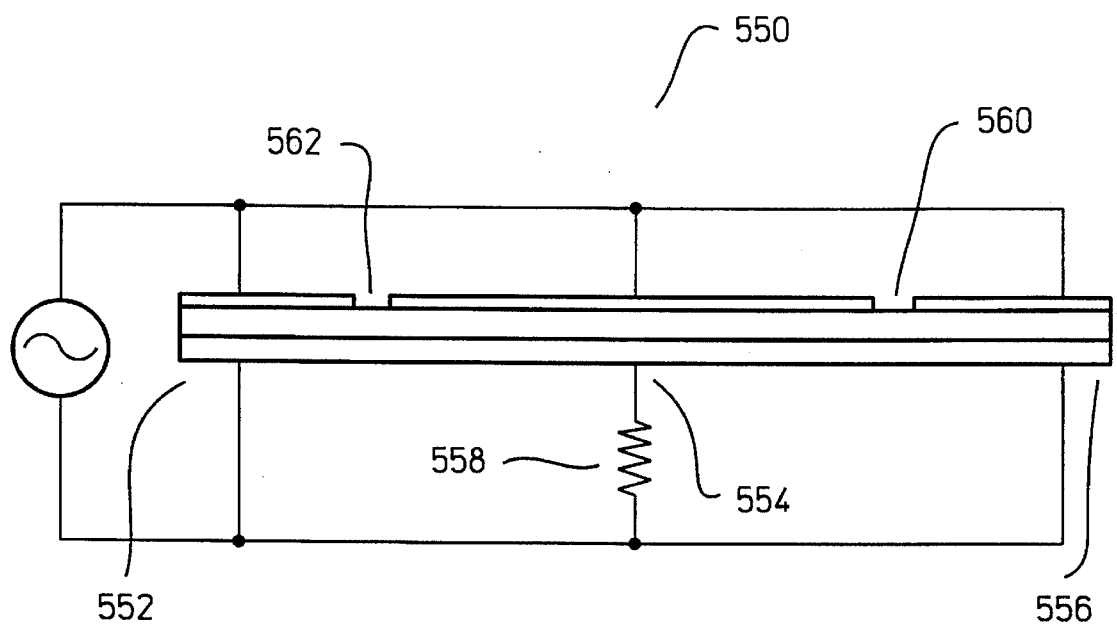
FIG. 14 shows a preferred electroluminescent element with its applied voltage higher at its ends than at its middle section.

A number of the electroluminescent elements described are in an elongated shape with flat-top surfaces. They have a length and a width, with the length much larger in value than the width. Due to the discontinuities at the two ends of the elements, the intensity of the emitted radiation scanning the medium adjacent to the two ends is slightly lower than the intensity of the emitted radiation scanning the medium adjacent to the center of the element. One way to compensate for the slight drop in intensity at the two ends is to have an element that is slightly longer than is required, and not use the radiation at the two ends. FIGS. 12–14 show other preferred methods to compensate for the slight drop at the ends.

FIG. 12 shows a preferred electroluminescent element 500 with its width wider at its ends, 502 and 504, than at its middle section 506. A wider width generates more radiation, which would compensate for the drop at the ends.

FIG. 13 shows a preferred electroluminescent element 525 with its active layer 527 thinner at its ends, 529 and 531, than at its middle section 533. With the same voltage applied across the entire active layer, a thinner active layer will experience a higher electric power input, which would generate radiation at a higher intensity.

FIG. 14 shows a preferred electroluminescent element 550 with a higher voltage applied at its ends, 552 and 556, than at its middle section, 554. One way to achieve this result is by electrically isolating the middle section of one of the electrodes from its two ends, and by adding a resistor 558 at the middle section 554 of the element 550. In the embodiment shown in FIG. 14, the middle section of the transparent electrode is isolated by two gaps 560 and 562. Again, a higher voltage would create a higher electric field, which would generate radiation at a higher intensity.

Figure 15:
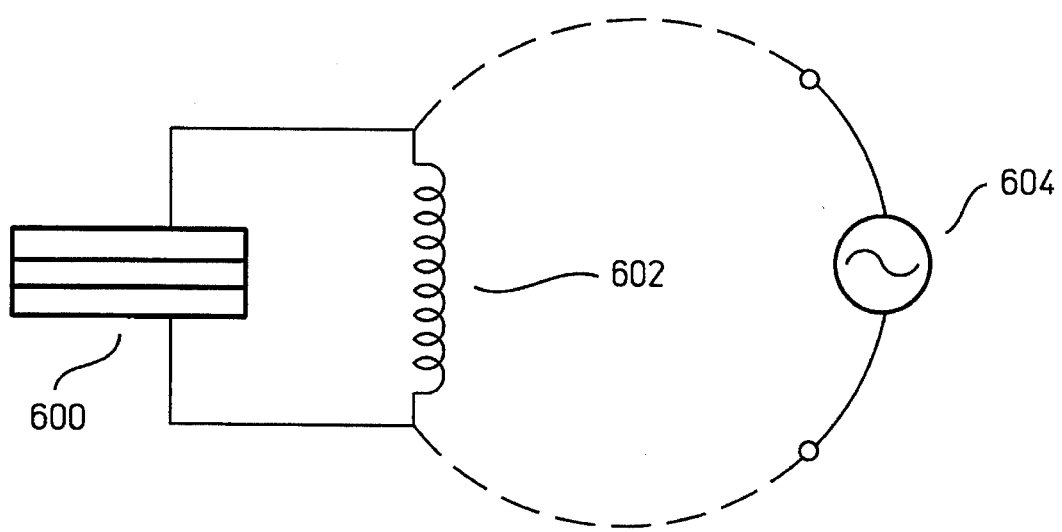
FIG. 15 shows a preferred electroluminescent element connected to an inductor.

Each electroluminescent element has a capacitive effect. One way to increase the power efficiency of the element is shown in FIG. 15, where a preferred electroluminescent element 600 is connected to an inductor 602. The resonating effect of the circuit reduces the amount of power required to activate the element. The inductor may be the secondary winding of a transformer. Then a voltage source 604 can be coupled to the LC circuit to deliver power to the electroluminescent device by connecting the voltage source to the primary winding of the transformer. The frequency of the voltage source 604 should be equal to the resonant frequency of the LC circuit.

The scanner described in the present invention may be a desk-top scanner or a portable scanner. It may be used as a stand-alone scanner, or it may be incorporated in a copier, a fax machine or the "erase bar" of an electrophotographic printer. Such instruments should be well-known to those skilled in the art, and will not be further described in this application. If the scanner is used for a typical A4 size paper (8.5" by 11"), then the elements may need to be more than 8.5 inches in length.

In the above descriptions, typically, color generation is achieved by three electroluminescent elements. However, it should be obvious to those skilled in the art that color generation can be achieved by two or more elements.

Figure 16:
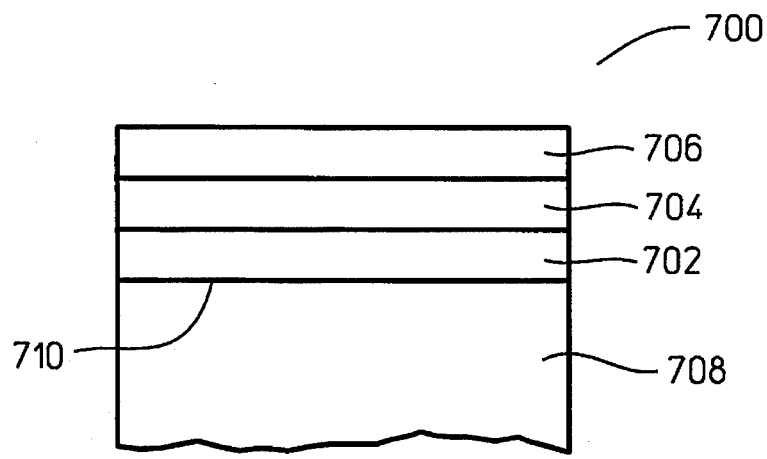
FIG. 16 shows a preferred electroluminescent element with a transparent electrode adjacent to a transparent substrate.

The surface covering the transparent electrode is typically defined as the top surface. However, top and bottom are relative terms. FIG. 16 shows a preferred embodiment 700 with a reflective electrode 706 on top of a radiation generating stack 704, which is, in turn, on top of a transparent electrode 702. If one flips the preferred embodiment 700 upside down, the transparent electrode 702 will be on top. In the embodiment shown in FIG. 16, the "top" surface 710 of the transparent electrode 702 is adjacent to a transparent substrate 708, such as glass.

Figure 17:
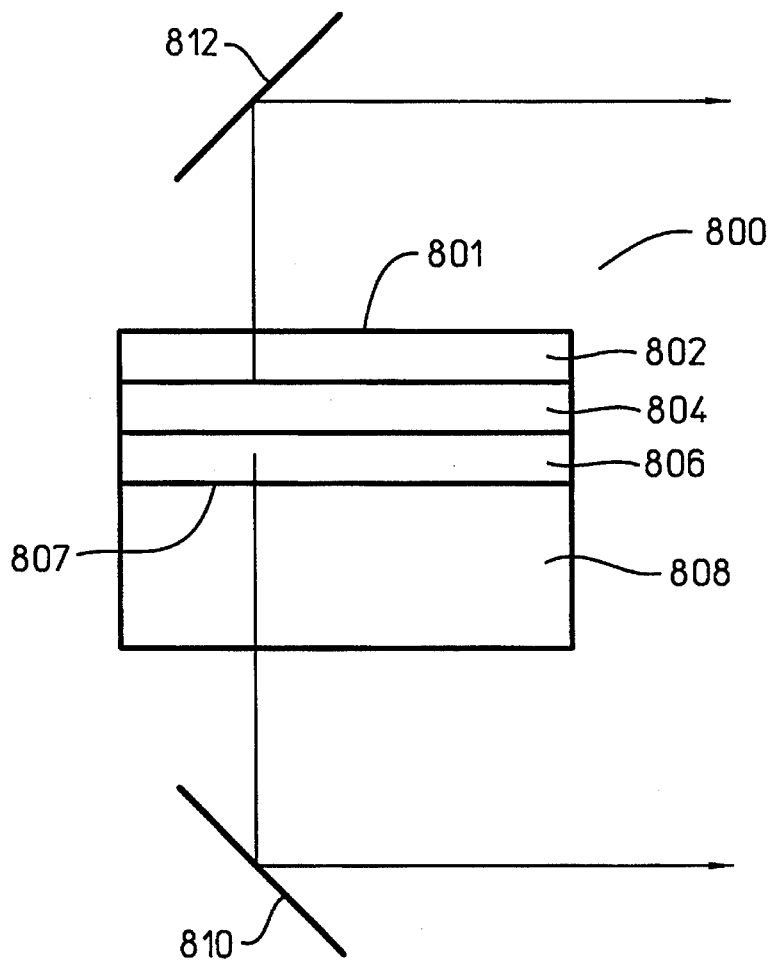
FIG. 17 shows a preferred electroluminescent element with two transparent electrodes.

In most of the embodiments described, the electroluminescent element includes a transparent electrode and a reflective electrode. FIG. 17 shows another preferred embodiment 800 with both electrodes being transparent. The embodiment 800 includes a first transparent electrode 802 with a first surface 801, a radiation generating stack 804, a second transparent electrode 806 with a second surface 807, and a transparent substrate 808. Most of the emitted radiation generated is emitted from both the first and the second surfaces. The emitted radiation is substantially uniform across both the first and the second surfaces to create a uniform radiation source. One way to direct the emitted radiation towards one direction is to have two mirrors, 810 and 812, to reflect the emitted radiation.

Other embodiments of the invention will be apparent to those skilled in the art from a consideration of this specification or practice of the invention disclosed herein. It is intended that the specification and examples be considered as exemplary only, with the true scope and spirit of the invention being indicated by the following claims.

We claim:

1. An electroluminescent device used as an illuminating source in a scanning apparatus to scan a medium with a plurality of areas in a first dimension, and a plurality of areas in a second dimension, and with each area capable of carrying information, the device comprising a solid-state electroluminescent element, which comprises:

a transparent electrode with a top surface;

a radiation generating stack under the transparent electrode; and a second electrode under the radiation generating stack, the second electrode having a bottom surface;

such that:

radiation is generated from the radiation generating stack when a selected voltage source is coupled across the electrodes;

most of the radiation generated is emitted from the top surface; and when the scanning apparatus scans the medium, the emitted radiation is substantially uniform at least across the top surface of the transparent electrode to create uniform radiation for illuminating a plurality of areas across the first dimension and at least one area across the second dimension of the medium.

2. An electroluminescent device as recited in claim 1 wherein the second electrode is a reflective electrode.

3. An electroluminescent device as recited in claim 1 wherein the radiation generating stack includes:

a first dielectric layer;

a second dielectric layer; and a plurality of active layers between the two dielectric layers;

such that the radiation emitted from different active layers centers around different frequencies so that the combined effect of all the radiation has a desired spectral power distribution.

4. An electroluminescent device as recited in claim 1 wherein the radiation generating stack includes at least one dielectric layer and an active layer.

5. An electroluminescent device as recited in claim 4 further comprising a plurality of electroluminescent elements forming a stack, each being substantially identical to the one recited in claim 4 except the emitted radiation from a different element centers around a different frequency so that the combined effect of all the emitted radiation has a desired spectral power distribution.

6. An electroluminescent device as recited in claim 1 wherein the electroluminescent element includes a filter layer to control the color of the radiation emitted from the element.

7. An electroluminescent device as recited in claim 1 further comprising an optical element adjacent to the top surface of the transparent electrode to control the beamwidth of the emitted radiation.

8. An electroluminescent device as recited in claim 7 wherein:

the optical element is optically coupled to the top surface;

the radiation generating stack includes an active layer, which has a refractive index; and the refractive index of the optical element is substantially the same as the refractive index of the active layer.

9. An electroluminescent device as recited in claim 8 wherein the refractive index of the transparent electrode is substantially the same as the refractive index of the active layer.

10. An electroluminescent device as recited in claim 1 further comprising:

a sensor for measuring the radiation reflected from the medium; and an optical element to direct the radiation reflected from the medium to be measured by the sensor.

11. An electroluminescent device as recited in claim 1 further comprising a second electroluminescent element that is substantially identical and positioned adjacent to the electroluminescent element recited in claim 1.

12. An electroluminescent device as recited in claim 11 further comprising a sensor;

such that:

the scanning apparatus has a scanning surface that is substantially in contact to the medium when the medium is scanned;

the sensor is located between the two electroluminescent elements; and the top surfaces of the transparent electrodes of the two electroluminescent elements are substantially coplanar to each other, and parallel and in close proximity to the scanning surface.

13. An electroluminescent device as recited in claim 12 wherein the two electroluminescent elements and the sensor are integrated.

14. An electroluminescent device as recited in claim 12 further comprising an optical element to control the radiation reflected from the medium to be measured by the sensor;

such that the distance separating the two electroluminescent elements depends on the lens structure used.

15. An electroluminescent device as recited in claim 1 further comprising at least one more electroluminescent element that is substantially identical and positioned adjacent to the electroluminescent element recited in claim 1, except the radiation from each element being centered around a frequency different from the other element;

such that:

the elements are electronically controlled to emit radiation sequentially.

16. An electroluminescent device as recited in claim 15 further comprising an optical element for each electroluminescent element to help combining the radiation from the three elements.

17. An electroluminescent device as recited in claim 1 further comprising at least one more electroluminescent element that is substantially identical and positioned adjacent to the electroluminescent element recited in claim 1, except the radiation from each element being centered around a frequency different from the other element;

such that:

the elements are electronically controlled to emit radiation; and the combined effect of the radiation from the elements is perceived to have a desired spectral power distribution.

18. An electroluminescent device as recited in claim 1 further comprising:

a plurality of a first group of electroluminescent elements, each being substantially identical to the element recited in claim 1;

a plurality of a second group of electroluminescent elements, each being substantially identical to the element recited in claim 1, except the radiation from each element in the second group being centered around a frequency different from that of the element recited in claim 1; and a plurality of a third group of electroluminescent elements, each being substantially identical to the element recited in claim 1, except the radiation from each element in the third group being centered around a frequency different from that of the element recited in claim 1, and the elements in the second group;

such that:

the elements are selected to be structurally arranged sequentially according to their corresponding group number, repeating with an element selected from the first group after an element from the third group has been selected; and elements are electronically controlled so that elements from each group emit radiation together.

19. An electroluminescent device as recited in claim 1 wherein the element is curved to control the directions of the emitted radiation.

20. An electroluminescent device as recited in claim 1 wherein the electroluminescent element has an elongated shape;

such that the widths at the two ends of the element are wider than the width at the middle of the element to increase the uniformity of the emitted radiation at the medium when the scanning apparatus is scanning the medium.

21. An electroluminescent device as recited in claim 1 wherein:

the electroluminescent element has an elongated shape; and the radiation generating stack is thinner at the two ends of the element than at the middle of the element to increase the uniformity of the emitted radiation at the medium when the scanning apparatus is scanning the medium.

22. An electroluminescent device as recited in claim 1 wherein:

the electroluminescent element has an elongated shape;

the middle section of one of the electrodes is electrically isolated from its two ends;

the voltage applied at the two ends of the electroluminescent element is higher than at the middle of the element to increase the uniformity of the emitted radiation at the medium when the scanning apparatus is scanning the medium.

23. An electroluminescent device as recited in claim 1 wherein:

the device includes a plurality of interfacing surfaces;

at least one of the surfaces is toughened to increase the amount of the generated radiation to emit from the transparent electrode.

24. An electroluminescent device as recited in claim 1 further comprising an inductor connected across the two electrodes;

such that the electroluminescent element and the inductor form a reasonating circuit to increase the power efficiency of the element.

25. An electroluminescent device used as an illuminating source in a scanning apparatus, to scan a medium with a plurality of areas in a first dimension, and a plurality of areas in a second dimension, and with each area capable of carrying information, the device comprising a solid-state electroluminescent element, which comprises:

a transparent electrode with a top surface;

a radiation generating stack under the transparent electrode; and a second electrode under the radiation generating stack, the second electrode having a bottom surface;

such that:

radiation is generated from the radiation generating stack when a selected voltage source is coupled across the electrodes;

most of the radiation generated is emitted from the top and bottom surfaces; and when the scanning apparatus scans the medium, the emitted radiation is substantially uniform at least across the top surface of the transparent electrode to create uniform radiation for illuminating a plurality of areas across the first dimension and at least one area across the second dimension of the medium.

* * * * *